United States Patent
Shimakawa et al.

(10) Patent No.: US 9,631,752 B2
(45) Date of Patent: Apr. 25, 2017

(54) EXPANSION JOINT AND STEAM TURBINE SYSTEM INCLUDING THE SAME

(75) Inventors: Tsukasa Shimakawa, Hiroshima (JP); Jun Nagashima, Hiroshima (JP); Yuji Bando, Hiroshima (JP); Tomohiro Oshita, Tokyo (JP); Hiromu Nishijima, Chikushi (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 707 days.

(21) Appl. No.: 13/982,787

(22) PCT Filed: Feb. 21, 2012

(86) PCT No.: PCT/JP2012/054096
§ 371 (c)(1),
(2), (4) Date: Jul. 31, 2013

(87) PCT Pub. No.: WO2012/132640
PCT Pub. Date: Oct. 4, 2012

(65) Prior Publication Data
US 2013/0323027 A1   Dec. 5, 2013

(30) Foreign Application Priority Data

Mar. 31, 2011 (JP) .................................. 2011-080882

(51) Int. Cl.
*F01D 25/26* (2006.01)
*F01K 11/02* (2006.01)
(Continued)

(52) U.S. Cl.
CPC ............ *F16L 27/107* (2013.01); *F01D 25/26* (2013.01); *F01K 11/02* (2013.01); *F02C 7/28* (2013.01);
(Continued)

(58) Field of Classification Search
CPC .......... F01D 25/24; F01D 25/26; F01K 11/02; F16L 27/107; F16L 27/11; F16L 51/02;
(Continued)

(56) References Cited

U.S. PATENT DOCUMENTS 3,633,946 A    1/1972   Kazmierski, Jr.
4,090,726 A *  5/1978   Mischel ................ F16L 51/024
                                                    285/229
(Continued)

FOREIGN PATENT DOCUMENTS

EP    0 006 338   1/1980
JP    4-26652     6/1992
(Continued)

OTHER PUBLICATIONS

Notice of Allowance issued Sep. 14, 2015 in corresponding Australian patent application No. 2012235149.
(Continued)

*Primary Examiner* — Gregory Anderson
*Assistant Examiner* — Christopher R Legendre
(74) *Attorney, Agent, or Firm* — Wenderoth, Lind & Ponack, L.L.P.

(57) ABSTRACT

An expansion joint that is provided between a steam turbine outlet and a condenser inlet, including: an upstream baffle tube that has one end secured to an upstream fixing end and the other end as a free end, and forms a steam channel; a downstream baffle tube that has one end secured to a downstream fixed end and the other end as a free end, the free end being relatively movable outside the free end of the upstream baffle tube; and a flexible cylinder that is formed of a non-metal material using a resin sheet, and deformable while airtightly surrounding the baffle tubes.

3 Claims, 3 Drawing Sheets

(51) Int. Cl.
*F02C 7/28* (2006.01)
*F16L 27/107* (2006.01)
*F16L 27/11* (2006.01)
*F16L 51/02* (2006.01)
*F16L 51/03* (2006.01)

(52) U.S. Cl.
CPC .............. *F16L 27/11* (2013.01); *F16L 51/024* (2013.01); *F16L 51/03* (2013.01); *F05D 2220/31* (2013.01); *Y02T 50/671* (2013.01)

(58) Field of Classification Search
CPC ..... F16L 51/023; F16L 51/024; F16L 51/026; F16L 51/027; F16L 51/028; F16L 51/03; F02C 7/28
See application file for complete search history.

(56) References Cited

U.S. PATENT DOCUMENTS

| | | | |
|---|---|---|---|
| 4,189,926 A | 2/1980 | Hsu | |
| 4,299,414 A * | 11/1981 | Bachmann | F16L 51/021 285/187 |
| 4,732,413 A | 3/1988 | Bachmann et al. | |
| 5,311,715 A * | 5/1994 | Linck | F16J 15/065 52/396.01 |
| 5,378,026 A * | 1/1995 | Ninacs | F16L 51/024 285/229 |
| 5,443,290 A | 8/1995 | Boyer et al. | |
| 5,560,166 A | 10/1996 | Burke et al. | |
| 5,653,474 A * | 8/1997 | Ninacs | F16L 23/14 285/224 |
| 5,961,244 A * | 10/1999 | Hahn | F01K 11/02 403/291 |
| 6,402,203 B1 * | 6/2002 | Mathiesen | F16L 25/12 285/224 |
| 6,460,893 B1 * | 10/2002 | McGrath | F16L 51/024 285/299 |
| 2001/0030023 A1 | 10/2001 | Tippett | |
| 2013/0323027 A1 * | 12/2013 | Shimakawa | F02C 7/28 415/135 |

FOREIGN PATENT DOCUMENTS

| | | |
|---|---|---|
| JP | 5-7441 | 2/1993 |
| JP | 07-224684 | 8/1995 |
| JP | 10-196313 | 7/1998 |
| JP | 2933144 | 8/1999 |
| JP | 11-241799 | 9/1999 |
| JP | 2001-263562 | 9/2001 |
| JP | 2004-60736 | 2/2004 |
| JP | 2004-211868 | 7/2004 |
| JP | 4031726 | 1/2008 |
| JP | 2008-255967 | 10/2008 |

OTHER PUBLICATIONS

International Search Report mailed Mar. 27, 2012 in International (PCT) Application No. PCT/JP2012/054096 with partial English Translation.
Written Opinion of the International Searching Authority mailed Mar. 27, 2012 in International (PCT) Application No. PCT/JP2012/054096 with partial English Translation.
Catalog of R713, PTFE Expansion Joint 3 Mounts Bellows, pp. 81-82, 2011, with partial English translation.
Office Action issued May 19, 2015 in corresponding Japanese patent application No. 2011-080882 (with English translation).
Extended European Search Report issued Aug. 19, 2014 in corresponding European patent application No. 12765800.3.
Decision to Grant a Patent issued Sep. 6, 2016 in corresponding Japanese Patent Application No. 2011-080882.

* cited by examiner

FLOW OF STEAM

EXPANSION JOINT AND STEAM TURBINE SYSTEM INCLUDING THE SAME

TECHNICAL FIELD

The present invention relates to an expansion joint that absorbs relative displacement between a steam turbine and a condenser, and a steam turbine system including the same.

BACKGROUND ART

A steam channel connecting a steam turbine and a condenser in a steam turbine system uses an expansion joint for absorbing relative displacement between the steam turbine and the condenser. As the expansion joint, a bellows is often used, for example, as described in the following PTLs 1 and 2. In the bellows for this purpose, negative pressure is generated and steam at higher temperature (for example, 60° C. to 80° C.) than a room temperature flows. Thus, the bellows is made of stainless steel to ensure high airtightness and reliability.

CITATION LIST

Patent Literature

{PTL 1}
Japanese Unexamined Patent Application, Publication No.
{PTL 2}
Japanese Unexamined Patent Application, Publication No. H10-196313

SUMMARY OF INVENTION

Technical Problem

The stainless steel bellows is deformable within a small amount in a direction perpendicular to an axis thereof, and to obtain a desired movable amount, a plurality of bellows axially connected in series have to be used. For example, to obtain a movable amount of 20 mm in the direction, two bellows having a movable amount of 10 mm are connected in series and used. Also, to obtain a required movable amount in a direction perpendicular to the axis, a middle cylinder that can absorb a displacement angle corresponding to the movable amount is placed and held by two stainless steel bellows at the front and rear ends of the middle cylinder, thereby obtaining the movable amount. However, connecting the plurality of bellows in series increases an entire length in the axial direction and also increases weight thereof.

An LNG ship that receives, stores, and carries an LNG (liquefied natural gas), or an FSRU (Floating Storage and Regasification Unit) and an FPSO (Floating Production, Storage and Offloading) that are floating bodies that receive, store, and re-gasify LNG require a system for driving a compressor and an expander for carrying or re-gasifying LNG, or re-liquefying BOG (boil-off gas). To drive such a compressor and an expander, a steam turbine system for driving machines is used. However, while a steam turbine system is provided on a bottom of a ship, the steam turbine system for driving machines is generally provided on a deck side of a ship, and is significantly affected by rolling of the ship. Thus, in the steam turbine system for driving machines used in a floating body such as an FSRU or an FPSO, or in a ship such as an LNG ship, extremely large relative displacement is caused between a turbine low pressure chamber and a condenser.

The present invention is made in consideration of the aforementioned circumstances, and has an object to provide a compact and lightweight expansion joint with a large deformation amount, and a steam turbine including the same.

Solution to Problem

To achieve the above-described object, an expansion joint and a steam turbine system including the same of the present invention adopt the following solutions.

Specifically, a first aspect of the present invention provides an expansion joint that is provided between a steam turbine outlet and a condenser inlet, including: an inner metal cylinder that has one end secured to an upstream fixing end and the other end as a free end, and that forms a steam channel; an outer metal cylinder that has one end secured to a downstream fixed end and the other end as a free end, the free end being movable relative to the inner metal cylinder at a radial outside of the free end of the inner metal cylinder; and a flexible cylinder that is formed of a non-metal material using a resin sheet and that is deformable while airtightly surrounding an outer portion of the inner metal cylinder and an outer portion of the outer metal cylinder.

The outer metal cylinder relatively moves outside the inner metal cylinder, and thus the metal cylinder does not restrict displacement. The flexible cylinder formed of the non-metal material using the resin sheet is placed so as to airtightly surround the outer portions of the metal cylinders, thereby allowing a larger deformation amount than a stainless steel bellows. As such, a large deformation amount can be achieved, and thus a compact and lightweight expansion joint can be provided without any need to connect a plurality of expansion joints in series like conventional stainless steel bellows.

Also, the metal cylinders are placed on the steam channel side, and the flexible cylinder is placed outside the metal cylinders to increase airtightness, thereby increasing reliability.

The outer metal cylinder is placed downstream of the inner metal cylinder that forms the steam channel, and the free end of the outer metal cylinder is located outside the free end of the inner metal cylinder. Thus, steam cannot easily flow between the free ends of the metal cylinders. This can suppress a steam flow which passes between the inner metal cylinder and the outer metal cylinder and toward the flexible cylinder, and further increase reliability.

As the resin sheet, a PTFE resin sheet such as PTFE can be favorably used.

In the expansion joint according to the first aspect of the present invention, the flexible cylinder preferably includes a glass cloth stacked on the resin sheet.

The glass cloth is stacked on the resin sheet, thereby increasing strength of the flexible cylinder. This can prevent a break of the flexible cylinder even if, for example, the flexible cylinder is stretched and subjected to excessive tension.

Also, in the expansion joint according to the first aspect of the present invention, the steam turbine and the condenser are preferably components of a steam turbine system for driving machines mounted on a floating body or a ship for treating liquefied gas.

The mechanical drive steam turbine system mounted on a floating body such as an FSRU or an FPSO, or a ship for treating liquefied gas (for example, liquefied natural gas (LNG)) such as an LNG ship is provided on a deck side of the ship and is significantly affected by pitching and rolling of the ship. This increases relative displacement between the steam turbine and the condenser. The above described expansion joint can be provided in this position to allow large relative displacement. Further, the above described expansion joint has a large deformation amount and is compact and lightweight, and is thus particularly suitable for a ship with a limited load capacity and installation space.

Also, a second aspect of the present invention provides a steam turbine system including: a steam turbine rotationally driven by steam; a condenser that condenses steam discharged from the steam turbine; and an expansion joint which is configured according to any one of claims 1 to 3 and which is provided between the steam turbine and the condenser.

The steam turbine system includes the above described expansion joint, and thus can be compact and lightweight.

Advantageous Effects of Invention

The outer metal cylinder relatively moves relative to the inner metal cylinder at a radial outside of the inner metal cylinder, and the flexible cylinder formed of the resin sheet is placed so as to airtightly surround the metal cylinders. This allows a large deformation amount, and can provide a compact and lightweight expansion joint.

DESCRIPTION OF EMBODIMENT

Now, an embodiment according to the present invention will be described with reference to the drawings.

Figure 1:
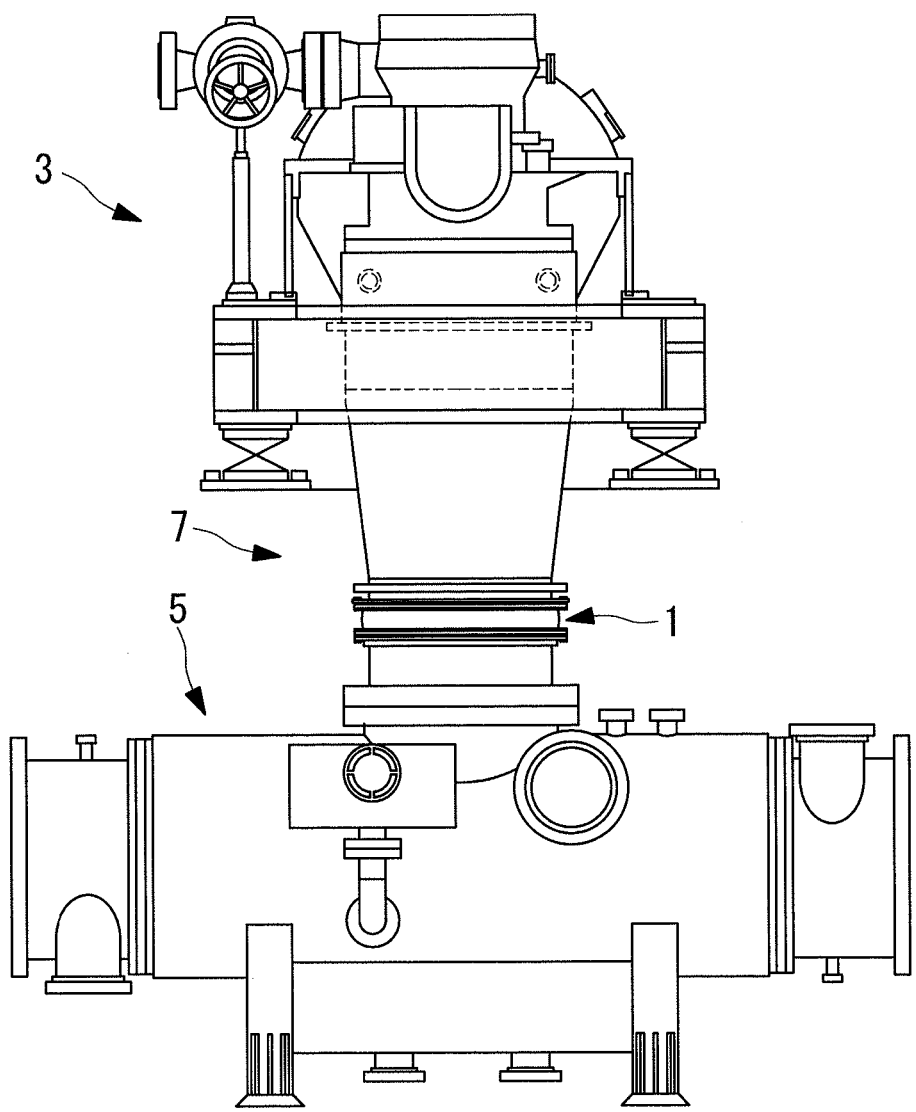
FIG. 1 is a front view showing a steam turbine system according to an embodiment of the present invention.

FIG. 1 shows a steam turbine system to which an expansion joint 1 according to an embodiment of the present invention is applied.

The steam turbine system is mounted on a deck side of a floating body such as an FSRU or an FPSO, or of a ship for treating liquefied gas (for example, liquefied natural gas (LNG)) such as an LNG ship, and is a steam turbine system for driving machines such as a compressor or an expander. The steam turbine system includes a steam turbine 3 that is driven by superheated steam supplied from an unshown boiler, and a condenser 5 connected below the steam turbine 3.

A rotational driving output of the steam turbine 3 is supplied to various machines such as a compressor and an expander. The condenser 5 cools, condenses, and liquefies low pressure steam having worked in the steam turbine 3. The condenser 5 is in a vacuum of, for example, about 100 Torr.

An exhaust pipe 7 through which the steam flows is connected between an outlet of the steam turbine 3 and an inlet of the condenser 5. In a middle position of the exhaust pipe 7, the expansion joint 1 is provided. The expansion joint 1 absorbs relative displacement between the steam turbine 3 and the condenser 5 caused by a difference in thermal expansion or pitching and rolling of a ship.

Figure 2:
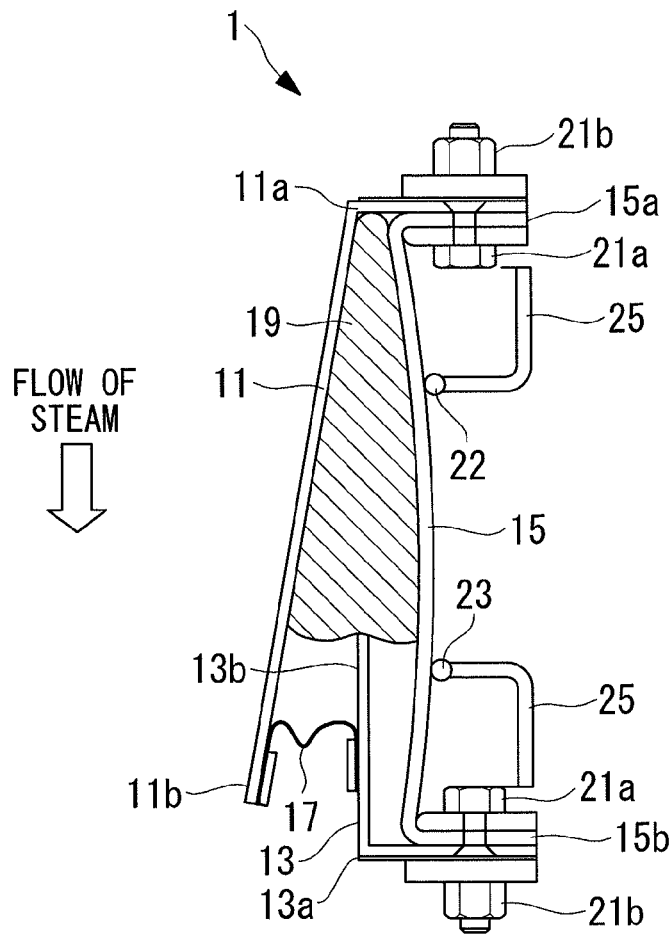
FIG. 2 is a vertical sectional view of essential parts showing an embodiment of an expansion joint in FIG. 1.

FIG. 2 is a vertical sectional view of essential parts of the expansion joint 1.

The expansion joint 1 includes an upstream baffle tube (inner metal cylinder) 11 that is provided in a radially innermost position and forms a steam channel, a downstream baffle tube (outer metal cylinder) 13 provided downstream and outside of the upstream baffle tube 11, and a flexible cylinder 15 that is deformable while airtightly surrounding the baffle tubes 11, 13.

The upstream baffle tube 11 is made of stainless steel, and has one end 11a secured to an upstream side of the exhaust pipe 7 (see FIG. 1) and the other end 11b as a free end. A plate-like securing portion bent outward is provided at the one end 11a of the upstream baffle tube 11, and the plate-like securing portion is fastened together with an upstream end 15a of the flexible cylinder 15.

The upstream baffle tube 11 has an inner diameter gradually decreasing from an upstream side to a downstream side of a steam flow, and is tapered in FIG. 2. However, the upstream baffle tube is not limited to ones having the tapered shape.

The downstream baffle tube 13 is made of stainless steel, and has one end 13a secured to a downstream side of the exhaust pipe 7 (see FIG. 1) and the other end 13b as a free end. A plate-like securing portion bent outward is provided at the one end 13a of the downstream baffle tube 13, and the plate-like securing portion is fastened together with a downstream end 15b of the flexible cylinder.

Although the downstream baffle tube 13 in FIG. 2 is cylindrical having a constant inner diameter in an axial direction, the downstream baffle tube 13 may have other cylindrical shapes.

A space is formed between the free end 11b of the upstream baffle tube 11 and the free end 13b of the downstream baffle tube 13, and a seal member 17 is provided in the space. The seal member 17 is placed to fill the space between the free ends 11b, 13b, and includes a glass cloth stacked with a PTFE (polytetrafluoroethylene) sheet and a stainless steel mesh. The seal member 17 primarily blocks steam flowing back and around in a direction opposite to a main flow direction and entering between the free ends 11b, 13b, and captures mist and dust in the steam.

A filling member 19 fills a space between the upstream baffle tube 11 and the flexible cylinder 15. The free end 13b of the downstream baffle tube 13 is located under the filling member 19, and the downstream baffle tube 13 supports the filling member 19 from below. The filling member 19 is a glass felt covered with a PTFE sheet. The filling member 19 secondarily blocks the steam having passed between the free ends 11b, 13b of the baffle tubes 11, 13 and passed through the seal member 17, and also holds a shape of the flexible cylinder 15 so that an axially middle portion of the flexible cylinder 15 protrudes toward the radially outside.

The flexible cylinder 15 is made of a non-metal material such as resin, for example, PTFE (polytetrafluoroethylene) or silicone, and/or a glass cloth. The flexible cylinder is cylindrical with the axially middle portion protruding toward the radial outside. At each of the upstream end 15*a* and the downstream end 15*b* of the flexible cylinder 15, a flange for securing is provided to hang over toward the radial outside. Each of the upstream end 15*a* and the downstream end 15*b* is fastened, via gaskets on opposite sides of each of the ends, together with the upstream baffle tube 11 and the downstream baffle tube 13 descried above by a bolt 21*a* and a nut 21*b*.

Wirings 22, 23 for holding a shape are provided at two positions which are located upper and lower positions in the middle portion of the flexible cylinder 15. The wirings 22, 23 are secured in place by using support plates 25 or the like having one end secured to upstream and downstream fixing ends.

Figure 3:
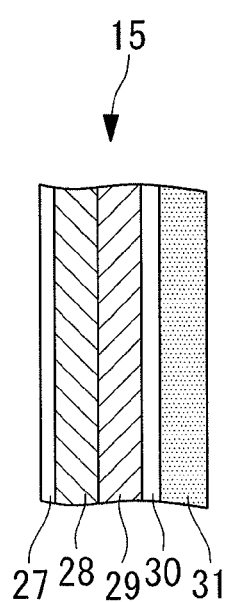
FIG. 3 is an enlarged partial vertical sectional view showing an embodiment of a flexible cylinder in FIG. 2.

FIG. 3 shows an enlarged partial vertical sectional view of the flexible cylinder 15.

As shown in FIG. 3, the flexible cylinder 15 includes, from an inner peripheral side toward an outer peripheral side, a first PTFE sheet 27 made of PTFE, a first silicone resin layer 28, a second silicone resin layer 29, a second PTFE sheet 30, and a glass cloth 31 whose inner peripheral is coated by PTFE.

Airtightness is mainly ensured by the first PTFE sheet 27 and the second PTFE sheet 30.

The first silicone resin layer 28 and the second silicone resin layer 29 between the PTFE sheets 27, 30 serve as heat insulating layers. As the silicone resin layers 28, 29, for example, CORNEX silicone (trade name) is favorably used. However, other materials may be used as long as they can serve as a heat insulating layer.

In this manner, in the flexible cylinder 15, the PTFE sheets 27, 30 and the silicone resin layers 28, 29 constitute a resin layer. A glass cloth 31 stacked on the resin layer is provided to reinforce the resin layer. This can prevent a break of the resin layer of the flexible cylinder 15 even if, for example, the flexible cylinder 15 is stretched and subjected to excessive tension.

Next, an operation of the above described expansion joint 1 will be described.

Steam discharged from the steam turbine 3 flows into the exhaust pipe 7, and flows from the upper side to the lower side. As shown in FIG. 2, the steam guided to the expansion joint 1 flows through the steam channel formed by the upstream baffle tube 11. A temperature of the steam when passing through the expansion joint 1 is 60° C. to 80° C., and a degree of vacuum is about 100 Torr. The steam having passed through the expansion joint 1 is guided to the condenser 5.

If a difference in thermal expansion or pitching and rolling of a ship causes relative displacement between the steam turbine 3 and the condenser 5, the expansion joint 1 serves to absorb the relative displacement. Specifically, the downstream baffle tube 13 placed outside the upstream baffle tube 11 is relatively displaced without being restrained by the upstream baffle tube 11. The flexible cylinder 15 is deformed in accordance with the relative displacement.

Figure 4A:
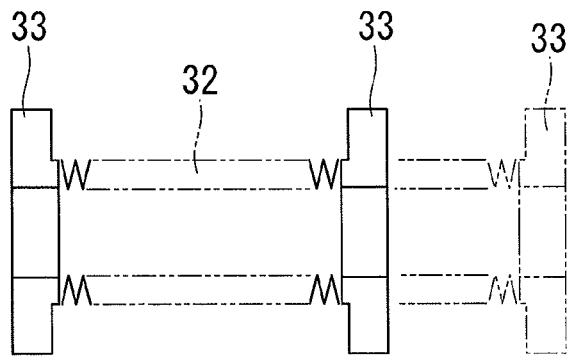
FIG. 4A schematically shows a pattern of displacement absorbed by the cylinder in a case in which the displacement is in an axial direction.
Figure 4B:
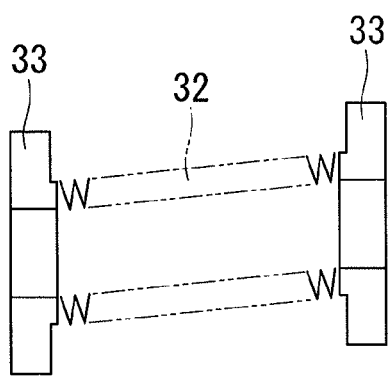
FIG. 4B schematically shows a pattern of displacement absorbed by the cylinder in a case in which the displacement is in a direction perpendicular to an axis.
Figure 4C:
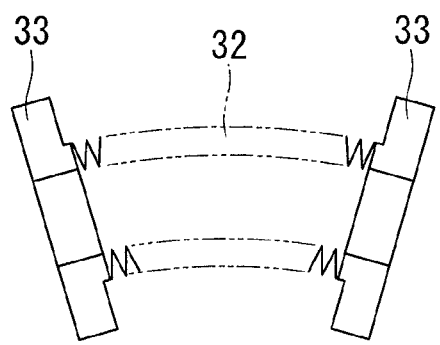
FIG. 4C schematically shows a pattern of displacement absorbed by the cylinder in a case in which the displacement is bending displacement.

FIGS. 4A-4C schematically show a pattern of displacement of the cylinder. FIG. 4A shows axial displacement such that a cylinder 32 expands and contracts in an axial direction, FIG. 4B shows displacement in a direction perpendicular to the axis such that connection flanges 33 at opposite ends move in parallel in the direction perpendicular to the axis, and FIG. 4C shows bending displacement such that the connection flanges 33 at the opposite ends are displaced with an angle and the axis of the cylinder 32 becomes arcuate.

Even with the displacement shown in FIGS. 4A-4C, the flexible cylinder 15 is made of non-metal and mainly made of resin, and is thus significantly deformed without providing a large reaction.

As described above, according to this embodiment, the following function and effect are obtained.

The downstream baffle tube 13 relatively moves outside the upstream baffle tube 11, and thus the metal baffle tubes 11, 13 do not restrict the relative displacement. The flexible cylinder 15 made of a non-metal material mainly including the resin layer is placed so as to airtightly surround the baffle tubes 11, 13, thereby allowing a larger deformation amount than a stainless steel bellows. In this manner, a large deformation amount can be obtained, and thus a compact and lightweight expansion joint can be provided without any need to connect a plurality of expansion joints in series like a conventional stainless steel bellows.

Also, the metal baffle tubes 11, 13 are placed on the steam channel, and the flexible cylinder 15 is placed outside the tubes 11, 13 to increase airtightness, thereby increasing reliability.

The downstream baffle tube 13 is placed downstream of the upstream baffle tube 11 that forms the steam channel, and the free end 13*b* of the downstream baffle tube 13 is located outside the free end 11*b* of the upstream baffle tube 11. Thus, steam cannot flow between the free ends 11*b*, 13*b* of the baffle tubes 11, 13 unless the steam flows toward the upstream side. This can prevent the steam flow from passing between the free ends 11*b*, 13*b* to the flexible cylinder 15, and thereby further increases reliability. Further, in this embodiment, the seal member 17 and the filling member 19 are provided, thereby further blocking the steam.

The glass cloth 31 is stacked on the resin layers 27, 28, 29, 30, thereby increasing strength of the flexible cylinder 15. This can prevent a break of the resin layer of the flexible cylinder 15 even if, for example, the flexible cylinder 15 is stretched and subjected to excessive tension.

The steam turbine system for driving machines mounted on a floating body such as an FSRU or an FPSO, or a ship for treating a liquefied gas (for example, a liquefied natural gas (LNG)) such as an LNG ship is provided on a deck side of the ship and is significantly affected by pitching and rolling of the ship. This increases relative displacement between the steam turbine and the condenser. In this embodiment, the above described expansion joint 1 is provided in this position to allow large relative displacement. Further, the expansion joint 1 has a large deformation amount and is compact and lightweight, and is thus particularly suitable for a ship with a limited load capacity and installation space.

REFERENCE SIGNS LIST

1 expansion joint
3 steam turbine
5 condenser
11 upstream baffle tube (inner metal cylinder)
13 downstream baffle tube (outer metal cylinder)
15 flexible cylinder

The invention claimed is:
1. An expansion joint comprising:
an inner metal cylinder that has one end secured to an upstream fixing end and the other end as a free end, and that forms a steam channel;
an outer metal cylinder that has one end secured to a downstream fixed end and the other end as a free end, the free end being movable relative to the inner metal cylinder at a radial outside of the free end of the inner metal cylinder; and a flexible cylinder that is formed of a non-metal material using a resin sheet and that is deformable while airtightly surrounding an outer portion of the inner metal cylinder and an outer portion of the outer metal cylinder, wherein a seal member which includes a glass cloth stacked with a polytetrafluoroethylene sheet and a stainless mesh is provided between the free end of the inner metal cylinder and the free end of the outer metal cylinder, wherein one end of the seal member is secured to the free end of the inner metal cylinder, and another end of the seal member is secured to the free end of the outer metal cylinder, and wherein a filling member is filled between the inner metal cylinder and the flexible cylinder, and an end of the filling member in a flow direction of steam is supported by the free end of the outer metal cylinder.

2. The expansion joint according to claim 1, wherein the flexible cylinder includes a glass cloth stacked on the resin sheet.

3. A steam turbine system for a floating body or a ship for treating liquefied gas comprising:
   a steam turbine rotationally driven by steam and having an outlet;
   a condenser that condenses steam discharged from the steam turbine and having an inlet; and
   an expansion joint which is configured according to claim 1 and which is provided between the steam turbine outlet and the condenser inlet.

* * * * *